United States Patent
Li et al.

(10) Patent No.: US 11,086,034 B2
(45) Date of Patent: Aug. 10, 2021

(54) METHOD AND APPARATUS FOR DETERMINING PERMEABILITY OF RESERVOIR

(71) Applicant: PetroChina Company Limited, Beijing (CN)

(72) Inventors: Ning Li, Beijing (CN); Hongliang Wu, Beijing (CN); Zhou Feng, Beijing (CN); Peng Liu, Beijing (CN); Kewen Wang, Beijing (CN); Qingfu Feng, Beijing (CN); Yusheng Li, Beijing (CN)

(73) Assignee: PetroChina Company Limited, Beijing (CN)

( * ) Notice: Subject to any disclaimer, the term of this patent is extended or adjusted under 35 U.S.C. 154(b) by 354 days.

(21) Appl. No.: 16/159,052

(22) Filed: Oct. 12, 2018

(65) Prior Publication Data
US 2019/0056519 A1  Feb. 21, 2019

(30) Foreign Application Priority Data
Aug. 15, 2017  (CN) .......................... 201710694990.7

(51) Int. Cl.
*G01V 1/30* (2006.01)
*G01V 3/20* (2006.01)
(Continued)

(52) U.S. Cl.
CPC .............. *G01V 1/306* (2013.01); *E21B 49/00* (2013.01); *G01V 1/50* (2013.01); *G01V 3/20* (2013.01);
(Continued)

(58) Field of Classification Search
CPC . G01V 1/306; G01V 1/50; G01V 3/20; G01V 11/00; G01V 2210/6169; G01V 2210/6244; G01V 2210/6246; E21B 49/00
See application file for complete search history.

(56) References Cited

U.S. PATENT DOCUMENTS 5,663,499 A * 9/1997 Semmelbeck ........... G01V 3/38
166/250.02
5,784,333 A * 7/1998 Tang ........................ G01V 1/50
166/250.02
(Continued)

FOREIGN PATENT DOCUMENTS

| CN | 102253069 A | 11/2011 |
| CN | 102373923 A | 3/2012 |

(Continued)

OTHER PUBLICATIONS

Zhang Guangcheng et al., Study on characteristics and application interpretation of acoustic full-wave train logging response, (and its English machine translation) pp. 152-153. Hubei science and technology press, Mar. 31, 2009; 5 pages.

(Continued)

*Primary Examiner* — Alessandro V Amari
*Assistant Examiner* — Christian T Bryant
(74) *Attorney, Agent, or Firm* — Harness, Dickey & Pierce, P.L.C.; Anthony G. Fussner

(57) ABSTRACT

The embodiments of the present disclosure disclose a method and an apparatus for determining the permeability of the reservoir. The method comprises: acquiring logging data corresponding to the two zones at least; determining the permeability of a specified zone in the two zones at least based on logging data corresponding to the specified zone, wherein the specified zone represents any one of the two zones at least; setting weight values corresponding to the at (Continued)

least two zones respectively; and determining the permeability of the reservoir based on the weight values and the permeability respectively corresponding to the two zones at least. The technical solutions provided by the embodiments of the present disclosure can improve the accuracy of the determined permeability of the reservoir.

7 Claims, 3 Drawing Sheets

(51) Int. Cl.
- *G01V 11/00* (2006.01)
- *E21B 49/00* (2006.01)
- *G01V 1/50* (2006.01)
- *G16Z 99/00* (2019.01)
- *G01N 15/08* (2006.01)
- *G01V 3/38* (2006.01)
- *G01V 5/04* (2006.01)

(52) U.S. Cl.
CPC ...... *G01V 11/00* (2013.01); *G01V 2210/6169* (2013.01); *G01V 2210/6244* (2013.01); *G01V 2210/6246* (2013.01)

(56) References Cited

U.S. PATENT DOCUMENTS

| | | | | |
|---|---|---|---|---|
| 2016/0230547 | A1* | 8/2016 | Lamei | E21B 47/06 |
| 2016/0253767 | A1* | 9/2016 | Langenwalter | E21B 41/0092 705/7.38 |

FOREIGN PATENT DOCUMENTS

| | | |
|---|---|---|
| CN | 103670390 A | 3/2014 |
| CN | 103884633 A | 6/2014 |
| CN | 104636819 A | 5/2015 |
| CN | 105221140 A | 1/2016 |
| CN | 105628584 A | 6/2016 |
| CN | 106323836 A | 1/2017 |
| GB | 2367130 A | 3/2002 |
| GB | 2462181 A | 2/2010 |
| WO | WO-2017151140 A1 | 9/2017 |
| WO | WO-2018075019 A1 | 4/2018 |

OTHER PUBLICATIONS

Chinese Second Office Action (and its English translation) and Search Report for Chinese application No. 201710694990.7 which is the parent application to the instant application, dated Dec. 18, 2019, 15 pages.
Great Britain Search Report from Great Britain Application No. 1816802.1 which claims priority to the instant application, dated Feb. 28, 2019, 2 pages.
Processing and Evaluation of Single-well Core Analysis data, Reservoir Physical Test Engineering, Dec. 1997, (machine translation), 15 pages.
Novelty Search Report for Chinese Application No. 2017106949907 filed Aug. 15, 2017 which is the parent application to the instant application, dated Jul. 26, 2017, 5 pages.
Li Ning et al., The Innovation and Development of Log Evaluation or Complex Carbonate Reservoir in China, Feb. 28, 2014, 10 pages.
Chinese First Office Action and Search Report and their English translation for Chinese application No. 201710694990.7 which is the parent application to the instant application, dated Jul. 22, 2019, 21 pages.

* cited by examiner

METHOD AND APPARATUS FOR DETERMINING PERMEABILITY OF RESERVOIR

TECHNICAL FIELD

The present disclosure relates to the technical field of oilfield exploration and well logging, in particular to a method and an apparatus for determining the permeability of reservoirs.

BACKGROUND ART

Permeability is one of the most important parameters in the process of the oilfield exploration and development, and its calculation accuracy has a great influence on the oilfield development benefit. Due to the strong heterogeneity and anisotropy of the complex fractured-vuggy reservoirs such as carbonate rocks and volcanic rocks, the determination of permeability of those complex fractured-vuggy reservoirs is always one of the most significant jobs in the well logging evaluation.

In the well logging at present, calculating the permeability mainly adopts the mathematic means such as establishing empirical fitting formulas or multiple regressions for the permeability, porosity, and median particle size based on core experimental information. For the homogeneous clastic rock reservoir, the porosity and permeability of the core analysis usually have a good correlation, and the permeability of the reservoir can be calculated through the obtained porosity-permeability relationships. However, for a carbonate reservoir with very strong heterogeneity, the porosity-permeability relationships established by the core experiment does not represent the seepage capacity of the entire reservoir, and its calculation accuracy and applicability are poor.

SUMMARY OF THE INVENTION

An objective of the embodiments of the present disclosure is to provide a method and an apparatus for determining the permeability of reservoirs, so as to improve the accuracy of the determined permeability of the reservoir.

In order to solve the above technical problem, the method and the apparatus for determining the permeability of the reservoir provided by the embodiments of the present disclosure are implemented as follows:

A method for determining the permeability of reservoirs, wherein the reservoir comprises at least two borehole radial zones, each of the borehole radial zones comprises annular regions centered on a well axis of a target well in the reservoir, and the annular regions are located outside the target well; the method comprises:

acquiring logging data corresponding to two radial zones at least in the radial direction;

determining the permeability values corresponding to all zones based on logging data, which include two radial zones at least;

setting weight values corresponding to all zones respectively; and determining the permeability of the reservoir based on the weight values and the permeability values corresponding to all zones.

In a preferred solution, one reservoir can be divided into four zones: the first zone, the second zone, the third zone, and the fourth zone. The distance between the first zone and the borehole wall ranges from 0 m to 0.1 m, the distance between the second zone and the borehole ranges from 0.1 m to 1 m, the distance between the third zone and the borehole ranges from 1 m to 10 m, and the distance between the fourth zone and the borehole wall ranges from 10 m to 40 m.

In a preferred solution, logging data corresponding to the first zone comprises an electrically imaged logging image;

logging data corresponding to the second zone comprises array acoustic logging data;

logging data corresponding to the third zone comprises monopole far-detection logging data; and logging data corresponding to the fourth zone comprises dipole far-detection logging data;

correspondingly, determining the permeability of the first zone based on the electrically imaged logging image;

determining the permeability of the second zone based on the array acoustic wave logging data;

determining the permeability of the third zone based on the monopole far-detection logging data; and determining the permeability of the fourth zone based on the dipole far-detection logging data.

In a preferred solution, determining the permeability of the first zone based on the electrically imaged logging image comprises:

calculating the porosity of specified pixel points in the electrically imaged logging image in the following formula:

$$\phi_i = \sqrt[m]{a \cdot b \cdot R_{mf} \cdot C_i}$$

where $\phi_i$ represents the porosity of the ith pixel point in the electrically imaged logging image; a and b represent lithology factors; m represents the formation cementation index; $R_{mf}$ represents the mud filtrate resistivity; and $C_i$ represents the conductivity of the ith pixel point in the electrically imaged logging image;

determining the porosity distribution spectrum based on the porosity of the specified pixel points;

dividing the porosity distribution spectrum into the matrix porosity distribution spectrum and the secondary porosity distribution spectrum according to the preset cutoff value, thereby obtaining the matrix porosity corresponding to the matrix porosity distribution spectrum and the secondary porosity corresponding to the secondary porosity distribution spectrum;

calculating the permeability of the first zone based on the matrix porosity and the secondary porosity in the following formula:

$$K_1 = f_1 10^{ka1 \times \varphi_{matrix} + kb1} + f_2 10^{ka2 \times \varphi_{fv} + kb2}$$

where $K_1$ represents the permeability of the first zone; $f_1$ and $f_2$ represent the matrix permeability coefficient and the secondary pore permeability coefficient respectively; ka1 and ka2 represent the porosity indexes respectively; kb1 and kb2 represent the permeability constants respectively; and $\varphi_{matrix}$ and $\varphi_{fv}$ represent the matrix porosity and the secondary porosity respectively.

In a preferred solution, determining the permeability of the second zone based on the array acoustic wave logging data comprises:

determining parameters of Stoneley wave corresponding to the second zone based on the array acoustic wave logging data, where the Stoneley wave paramaters comprise the attenuation and velocity of Stoneley wave;

calculating the permeability of the second zone based on Stoneley wave parameters in the following formula:

$$k = \sqrt{k_e^2 + \frac{2i\rho_{pf}\omega K_2 R}{\eta(R^2 - r^2)} \sqrt{-i\omega/D + k_e^2} \frac{A_1\left(R\sqrt{-i\omega/D + k_e^2}\right)}{A_0\left(R\sqrt{-i\omega/D + k_e^2}\right)}}$$

$$k = \frac{\omega}{v_{st}} + iAtt_{st}$$

wherein $K_2$ represents the permeability of the second zone; $\omega$ represents angular frequency; $\rho_{pf}$ and $\eta$ represent the density and the viscosity of pore fluid in the formation of the second zone respectively; R represents the radius of the well; r represents the radius of the well logging tool that acquires the array acoustic wave logging data; $k_e$ represents the wave number of Stoneley wave at the equivalent elastic formation of the second zone; $A_0$ and $A_1$ represent the 0th order second-class Bessel function of imaginary argument and a 1st order second-class Bessel function of imaginary argument respectively; D represents the fluid diffusion rate; k represents the wave number of Stoneley wave of the second zone; $v_{st}$ represents the Stoneley wave velocity; $Att_{st}$ represents the Stoneley wave attenuation; and i represents the imaginary unit and $i^2=-1$.

In a preferred solution, determining the permeability of the third zone based on the monopole far-detection logging data comprises:

performing migration imaging processing on reflected P-wave from the monopole far-detection logging data, to obtain P-wave migration imaging profile, where the P-wave migration imaging profile comprises a number of P-wave sampling points, amplitudes at positions of the P-wave sampling points, and a radial distance between adjacent S-wave sampling points;

determining the permeability of the third zone based on the P-wave migration imaging profile data in the following formula:

$$K_3 = a_1 \int_1^{10} |A_p|^{b_1} dx_1$$

where $K_3$ represents the permeability of the third zone; $A_p$ represents the amplitude at a position of a P-wave sampling point; $a_1$ and $b_1$ represent calculation indexes for the permeability of reflected P-wave; and $dx_1$ represents the radial distance between adjacent sampling points.

In a preferred solution, determining the permeability of the fourth zone based on the dipole far-detection logging data comprises:

performing migration imaging processing on reflected S-wave from the dipole far-detection logging data, to obtain S-wave migration imaging profile, where the S-wave migration imaging profile data comprises a number of S-wave sampling points, amplitudes at positions of the S-wave sampling points, and a radial distance between adjacent two of the S-wave sampling points;

determining the permeability of the fourth zone based on the transverse wave migration imaging profile data in the following formula:

$$K_4 = a_2 \int_{10}^{40} |A_s|^{b_2} dx_2$$

wherein, $K_4$ represents the permeability of the fourth zone; $A_s$ represents the amplitude at a position of one S-wave sampling point; $a_2$ and $b_2$ represent calculation indexes for the permeability of reflected S-wave respectively; and $dx_2$ represents the radial distance between adjacent S-wave sampling points.

In a preferred solution, setting weight values corresponding to at least two zones comprises:

determining a weight value of each zone according to the distance between the zone and the borehole wall.

In a preferred solution, determining the permeability of the reservoir based on the weight values and the permeability respectively corresponding to at least two zones comprises:

taking a sum of two zones at least, and every zone takes a product of the permeability and the corresponding weight value.

An apparatus for determining the permeability of a reservoir, where the reservoir comprises at least two zones, each of the zones comprises annular regions centered on a well in the reservoir, and the annular regions are located outside the well; the apparatus comprises: a logging data acquiring module, a zone permeability determining module, a weight value determining module and a reservoir permeability determining module; wherein, the logging data acquiring module is configured to acquire logging data corresponding to the at least two zones;

the zone permeability determining module is configured to determine the permeability of at least two zones based on logging data corresponding to the specified zone, wherein the specified zone represents any one of the two zones at least;

the weight value determining module is configured to set weight values corresponding to at least two zones; and the reservoir permeability determining module is configured to determine the permeability of the reservoir based on the weight values and the permeability corresponding to at least two zones.

The embodiments of the present disclosure provide a method and an apparatus for determining the permeability of a reservoir, which acquire logging data corresponding to the at least two zones respectively; determine the permeability of each of the zones based on the logging data corresponding to the zone in the at least two zones; set weight values corresponding to the at least two zones respectively; and determine the permeability of the reservoir based on the weight values and the permeability respectively corresponding to the at least two zones. Therefore, the permeability of the reservoir determined in the method of the present disclosure includes the permeability of a plurality of zones at different distances from the, and the accuracy is high.

BRIEF DESCRIPTION OF THE DRAWINGS

In order to more clearly describe the technical solutions in the embodiments of the present disclosure or in the prior art, the drawings to be used in the descriptions of the embodiments or the prior art will be briefly introduced as follows. Obviously, the drawings in the following descriptions just illustrate some embodiments of the present disclosure, and those skilled in the art can obtain other drawings from them without paying any creative effort.

DETAILED DESCRIPTION OF THE PREFERRED EMBODIMENTS

The embodiments of the present disclosure provide a method and an apparatus for determining the permeability of a reservoir.

In order that the technical solutions of the present disclosure can be better understood by those skilled in the art, the technical solutions in the embodiments of the present disclosure are clearly and completely described below in conjunction with the drawings in the embodiments of the present disclosure. Obviously, those described are merely a part, rather than all, of the embodiments of the present disclosure. Any other embodiment obtained by those skilled in the art based on the embodiments of the present disclosure without paying any creative effort should fall within the protection scope of the present disclosure.

The embodiments of the present disclosure provide a method for determining the permeability of a reservoir, wherein the reservoir comprises at least two zones, each of the zones comprises annular regions centered on a well axis of a target well in the reservoir, and the annular regions are located outside the target well.

In this embodiment, the reservoir may be a reservoir whose permeability still has not been determined, and the target well may be a well which has been opened in the reservoir.

In this embodiment, at least two zones comprised in the reservoir may be a first zone, a second zone, a third zone, and a fourth zone; wherein a distance between the first zone and the well may range from 0 m to 0.1 m, a distance between the second zone and the well may range from 0.1 m to 1 m, a distance between the third zone and the well may range from 1 m to 10 m, and a distance between the fourth zone and the well may range from 10 m to 40 m.

Figure 1:
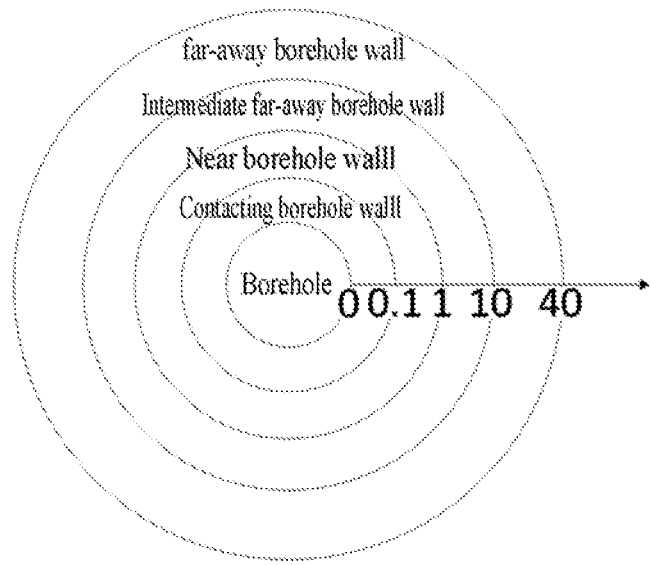
FIG. 1 is a schematic diagram of partitioning of borehole radial zones in an embodiment of the present disclosure.

For example, FIG. 1 is a schematic diagram of partitioning of zones in an embodiment of the present disclosure. As illustrated in FIG. 1, starting from a well axis, zones of concentric annular features and of different radius ranges may be sequentially partitioned in the reservoir along a radial direction. The first zone, the second zone, the third zone, and the fourth zone are a contacted zone, a near zone, an intermediate far-away zone, and a far-away zone respectively, wherein a distance between the contacted zone and the well ranges from 0 m to 0.1 m, a distance between the near zone and the well ranges from 0.1 m to 1 m, a distance between the intermediate far-away zone and the well ranges from 1 m to 10 m, and a distance between the far-away zone and the well ranges from 10 m to 40 m.

Figure 2:
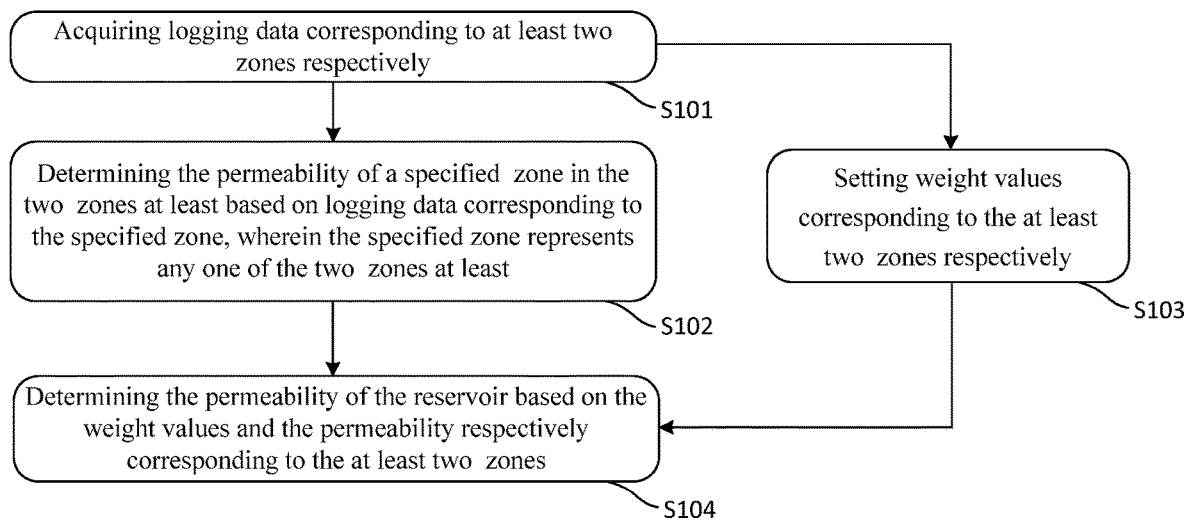
FIG. 2 is a flowchart of a method embodiment for determining the permeability of a reservoir in the present disclosure.

FIG. 2 is a flowchart of a method embodiment for determining the permeability of a reservoir in the present disclosure. As illustrated in FIG. 2, the method for determining the permeability of the reservoir comprises the steps of:

Step S101: acquiring logging data corresponding to at least two zones respectively.

In this embodiment, the logging data corresponding to the first zone may include: electrically imaged logging image, conventional logging information, mud property parameter during logging, well logging information, core information, etc. Since the rocks in the reservoir have different resistivity, the resistivity of each point on the borehole wall is measured by an electrical imaging logging instrument, and then the relative magnitudes of the resistivity are represented with gray scales, thereby forming an electrically imaged logging image.

In this embodiment, the logging data corresponding to the second zone may comprise array acoustic wave logging data.

In this embodiment, the logging data corresponding to the third zone may comprise monopole far-detection logging data.

In this embodiment, the logging data corresponding to the fourth zone may comprise dipole far-detection logging data.

Step S102: determining the permeability of a specified zone in the two zones at least based on logging data corresponding to the specified zone, wherein the specified zone represents any one of the two zones at least.

In this embodiment, the permeability of the first zone may be determined based on the electrically imaged logging image. Specifically, the electrical imaging logging instrument measures the electrical change characteristics of a formation in a way that a button electrode is attached to a; after a shallow resistivity calibration, the image change reflects the conductivity of the in the formation; next, according to the acquired logging data, a porosity of a specified pixel point in the electrically imaged logging image may be calculated in the Archie's formula:

$$\phi_i = \sqrt[m]{a \cdot b \cdot R_{mf} \cdot C_i}$$

wherein, $\phi_i$ represents a porosity of an i-th pixel point in the electrically imaged logging image and is dimensionless; a and b represent lithology factors in the Archie's formula and are dimensionless; m represents a formation cementation index and is dimensionless; $R_{mf}$ represents a mud filtrate resistivity which may be obtained by searching a mud property parameter during logging, in a unit of Ohm·meter (Ω·m); and $C_i$ represents a conductivity of the i-th pixel point in the electrically imaged logging image, in a unit of Siemens per meter (S/m). The specified pixel point may be any one of the pixel points in the electrically imaged logging image. Next, a porosity distribution spectrum may be determined according to the porosity of the specified pixel point. Then, according to a preset porosity spectrum cutoff value, the porosity distribution spectrum may be divided into a matrix porosity distribution spectrum and a secondary porosity distribution spectrum, thereby obtaining a matrix porosity corresponding to the matrix porosity distribution spectrum and a secondary porosity corresponding to the secondary porosity distribution spectrum. Finally, based on the matrix porosity and the secondary porosity, the permeability of the first zone may be calculated in the following formula:

$$K_1 = f_1 10^{ka1 \times \varphi_{matrix} + kb1} + f_2 10^{ka2 \times \varphi_{fv} kb2}$$

wherein, $K_1$ represents the permeability of the first zone, in a unit of millidarcy (md); $f_1$ and $f_2$ represent a matrix permeability coefficient and a secondary pore permeability coefficient respectively; ka1 and ka2 represent porosity indexes respectively, which are usually 200 to 300 and dimensionless; kb1 and kb2 represent permeability constants respectively, which are usually −2.5 and dimensionless; $\varphi_{matrix}$ and $\varphi_{fv}$ represent the matrix porosity and the secondary porosity respectively, and are dimensionless.

In this embodiment, the permeability of the second zone may be determined based on the array acoustic wave logging data. Specifically, Stoneley wave information corresponding to the second zone may be determined based on the array acoustic wave logging data, wherein the Stoneley wave information comprises at least one of a Stoneley wave attenuation rate and a Stoneley wave velocity. Based on the Stoneley wave information, the permeability of the second zone may be calculated in the following formula:

$$k = \sqrt{k_e^2 + \frac{2i\rho_{pf}\omega K_2 R}{\eta(R^2-r^2)}\sqrt{-i\omega/D+k_e^2}\frac{A_1\left(R\sqrt{-i\omega/D+k_e^2}\right)}{A_0\left(R\sqrt{-i\omega/D+k_e^2}\right)}}$$

$$k = \frac{\omega}{v_{st}} + iAtt_{st}$$

wherein, $K_2$ represents the permeability of the second zone in a unit of millidarcy; $\omega$ represents an angular frequency; $\rho_{pf}$ and $\eta$ represent a density and a viscosity of pore fluid in a formation of the second zone respectively, in units of gram per cubic centimeter (g/cm³) and centipoises (cp) respectively, and may be obtained by nuclear magnetic resonance logging or through rock physical experiments by taking core information from the well; R represents a radius of the target well, in a unit of meter, and may be acquired from caliper logging information; r represents a radius of a logging instrument that acquires the array acoustic wave logging data, in a unit of meter; $k_e$ represents a Stoneley wave number of an equivalent elastic formation of the second zone, in a unit of 1/meter (m⁻¹), and may be determined using a formation longitudinal wave time difference, a formation transverse wave time difference and a density in the array acoustic wave logging data; $A_0$ and $A_1$ represent a 0-th order second-class Bessel function of imaginary argument and a $1^{st}$ order second-class Bessel function of imaginary argument respectively; D represents a fluid diffusion rate, in a unit of square meter per second (m²/s); k represents a Stoneley wave number of the formation of the second zone; $v_{st}$ represents the Stoneley wave velocity, in a unit of meter per second (m/s); $Att_{st}$ represents the Stoneley wave attenuation rate, in a unit of decibel per meter (dB/m); i represents an imaginary unit and $i^2=-1$. Wherein, the array acoustic wave logging data may be processed in a Prony method, thereby obtaining the Stoneley wave velocity $v_{st}$ and the Stoneley wave attenuation rate $Att_{st}$ within the entire frequency range.

In this embodiment, the entire frequency range may be based on the monopole far-detection logging data to determine the permeability of the third zone. The permeability of the third zone may be determined based on the monopole far-detection logging data. Specifically, a first migration imaging processing may be performed on longitudinal reflected wave data in the monopole far-detection logging data, to obtain longitudinal wave migration imaging profile data, wherein the longitudinal wave migration imaging profile data may comprise a plurality of longitudinal wave sampling points, amplitudes at positions of the longitudinal wave sampling points, and a radial distance between adjacent two of the longitudinal wave sampling points. Next, based on the longitudinal wave migration imaging profile data, the permeability of the third zone may be determined in the following formula:

$$K_3 = a_1 \int_{10}^{10} |A_p|^{b_1} dx_1$$

wherein, $K_3$ represents the permeability of the third zone, in a unit of millidarcy; $A_p$ represents an amplitude at a position of a longitudinal wave sampling point; $a_1$ and $b_1$ represent calculation indexes for the permeability of a longitudinal reflection wave respectively, and are dimensionless; and $dx_1$ represents the radial distance between adjacent two of the longitudinal wave sampling points, in a unit of meter.

In this embodiment, the permeability of the fourth zone may be determined based on the dipole far-detection logging data. Specifically, a second migration imaging processing may be performed on transverse reflected wave data in the dipole far-detection logging data, to obtain transverse wave migration imaging profile data, wherein the transverse wave migration imaging profile data may comprise a plurality of transverse wave sampling points, amplitudes at positions of the transverse wave sampling points, and a radial distance between adjacent two of the transverse wave sampling points. Next, based on the transverse wave migration imaging profile data, the permeability of the fourth zone may be determined in the following formula:

$$K_4 = a_2 \int_{10}^{40} |A_s|^{b_2} dx_2$$

wherein, $K_4$ represents the permeability of the fourth zone, in a unit of millidarcy; $A_s$ represents an amplitude at a position of a transverse wave sampling point; $a_2$ and $b_2$ represent calculation indexes for the permeability of a transverse reflection wave respectively, and are dimensionless; and $dx_2$ represents the radial distance between adjacent two of the transverse wave sampling points, in a unit of meter.

Step S103: setting weight values corresponding to the at least two zones respectively.

In this embodiment, setting weight values corresponding to the at least two zones respectively may comprise: determining a weight value of each of the zones according to a distance between the zone and the wall. Specifically, the weight value of the zone decreases as the distance between the zone and the increases. For example, according to the radial distance between the of the target well and each of the first to fourth zones, the weight values of the first to fourth zones may be set to be 0.4, 0.25, 0.2, and 0.15 respectively.

It should be noted that step S103 may be performed before or after step S102, which is not limited herein.

Step S104: determining the permeability of the reservoir based on the weight values and the permeability respectively corresponding to the at least two zones.

In this embodiment, determining the permeability of the reservoir based on the weight values and the permeability respectively corresponding to the at least two zones specifically may comprise: taking a sum of a product of the permeability of each of the at least two zones and corresponding weight value as the permeability of the reservoir. For example, the permeability of the reservoir may be determined in the following formula:

$$K = \lambda_1 K_1 + \lambda_2 K_2 + \lambda_3 K_3 + \lambda_4 K_4$$

wherein K represents the permeability of the reservoir; $K_1$, $K_2$, $K_3$ and $K_4$ represent the first zone, the second zone, the third zone and the fourth zone respectively; $\lambda_1$, $\lambda_2$, $\lambda_3$ and $\lambda_4$ represent weight values of the first zone, the second zone, the third zone and the fourth zone respectively.

The method embodiment for determining the permeability of the reservoir acquires logging data corresponding to the at least two zones respectively; determines the permeability of each of the zones based on the logging data corresponding to the zone in the at least two zones; sets weight values corresponding to the at least two zones respectively; and determines the permeability of the reservoir based on the weight values and the permeability respectively corresponding to the at least two zones. Therefore, the permeability of the reservoir determined in the method of the present disclosure includes the permeability of a plurality of zones at different distances from the, and the accuracy is high.

Figure 3:
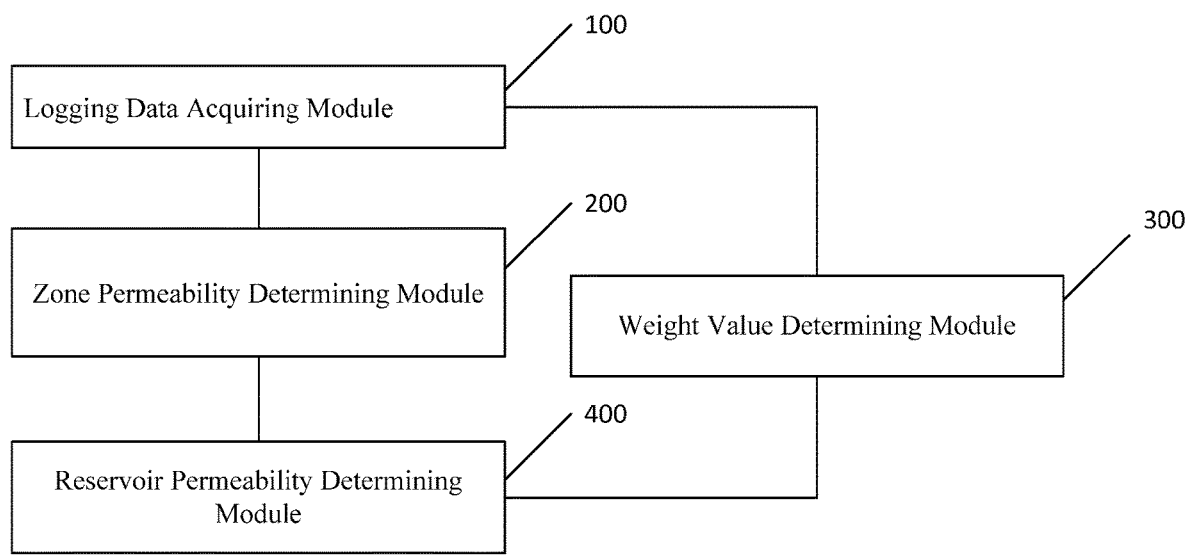
FIG. 3 is a structural composition diagram of an apparatus embodiment for determining the permeability of a reservoir in the present disclosure.

FIG. 3 is a structural composition diagram of an apparatus embodiment for determining the permeability of a reservoir in the present disclosure. The reservoir comprises at least two zones, wherein each of the zones comprises annular regions centered on a well axis of a target well in the reservoir, and wherein the annular regions are located outside the target well.

As illustrated in FIG. 3, the apparatus may comprise: a logging data acquiring module 100, a zone permeability determining module 200, a weight value determining module 300 and reservoir permeability determining module 400.

The logging data acquiring module 100 may be configured to acquire logging data corresponding to the at least two zones respectively.

The zone permeability determining module 200 may be configured to determine the permeability of a specified zone in the at least two zones based on logging data corresponding to the specified zone, wherein the specified zone represents any one of the at least two zones.

The weight value determining module 300 may be configured to set weight values corresponding to the at least two zones respectively.

The reservoir permeability determining module may be configured to determine the permeability of the reservoir based on the weight values and the permeability respectively corresponding to the at least two zones.

The apparatus embodiment for determining the permeability of a reservoir is corresponding to the method embodiment for determining the permeability of a reservoir, and it can implement the technical solution of the method embodiment for determining the permeability of a reservoir, and achieve the technical effect of the method embodiment.

In the 1990s, an improvement to a technology could be clearly distinguished as a hardware improvement (e.g., an improvement to a circuit structure such as diode, transistor, switch, etc.) or a software improvement (an improvement to a methodical flow). However, with the development of the technology, the improvements to many methodical flows nowadays can be deemed as direct improvements to the hardware circuit structure. The designers almost always obtain the corresponding hardware circuit structure by programming the improved methodical flows into the hardware circuit. Thus, it cannot be said that an improvement to a methodical flow cannot be implemented by a hardware entity module. For example, a Programmable Logic Device (PLD) (such as a Field Programmable Gate Array (FPGA)) is such an integrated circuit whose logic function is determined by the user's programming of the device. The designers themselves program to "integrate" a digital system to a single PLD, without requiring any chip manufacturer to design and manufacture the dedicated integrated circuit chips. Moreover, today, instead of manually making the integrated circuit chips, the programming is mostly implemented using the software "logic compiler". It is similar to the software compiler used in program development and drafting, and the previous original codes also need to be compiled in a specific programming language, which is referred to as the Hardware Description Language (HDL). In addition, there are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, the Very-High-Speed Integrated Circuit Hardware Description Language (VHDL) and Verilog 2 are most commonly used. It is also be apparent to those skilled in the art the hardware circuit for implementing the logic methodical flows can be easily obtained by slightly programming the methodical flows into the integrated circuit with the above hardware description languages.

The controller may be implemented in any suitable way. For example, the controller may take the form of, for example, a microprocessor or processor, and a computer readable medium storing computer readable program codes (e.g., software or firmware) executable by the (micro) processor, a logic gate, a switch, an application-specific integrated circuit, a programmable logic controller, and an embedded microcontroller. The examples of the controller include, but not limited to, the microcontrollers such as ARC 625D, Atmel AT91SAM, Microchip PIC18F26K20, and Silicone Labs C8051F320. The controller of the memory may also be implemented as a part of control logic of the memory.

As also known to those skilled in the art, in addition to implementing the controller merely with the computer readable program codes, it is completely possible to logically program the methodical steps to enable the controller to realize the same function in the form such as a logic gate, a switch, an application-specific integrated circuit, a programmable logic controller, or an embedded microcontroller. Thus, the controller may be considered as a hardware component, while means included therein for realizing various functions may also be regarded as structures within the hardware component. Or, the means for realizing various functions even may be regarded as either software modules that can implement the method or structures within the hardware component.

Any apparatus or module set forth in the embodiments specifically may be implemented by a computer chip or an entity, or by a product having a certain function.

For the convenience of description, when an apparatus is to be described, it is divided into various modules based on its functions and described respectively. Of course, the functions of the various modules may be realized in the same one or more software and/or hardware when the present disclosure is implemented.

As can be seen from the descriptions of the above embodiments, those skilled in the art can clearly understand that the present disclosure can be implemented by means of software plus a necessary universal hardware platform. Based on this understanding, the essence of the technical solution of the present disclosure or the part making a contribution to the prior art can be embodied in the form of a computer software product. In a typical configuration, the computing device comprises one or more processors (CPUs), an input/output interface, a network interface and a memory. The computer software product may include several instructions to enable a computer device (a personal computer, a server, a network device, etc.) to carry out embodiments of the present disclosure, or methods described in some parts of the embodiments. The computer software product may be stored in a memory, which may have the form of a volatile memory, a Random-Access Memory (RAM) and/or a nonvolatile memory such as Read-Only Memory (ROM) or a flash RAM, etc. among the computer readable medium. The memory is an example of the computer readable medium. The computer-readable medium includes permanent and non-permanent, removable and non-removable media, which can realize the information storage in any method or technique. The information can be computer readable instructions, data structures, program modules or other data. An example of the computer storage medium includes, but not limited to, a phase change memory (PRAM), a static random access memory (SRAM), a dynamic random access memory (DRAM), other types of random access memory (RAM), a read-only memory (ROM), an electrically-erasable programmable read-only memory (EEPROM), a flash memory or other memory techniques, a compact disk read only memory (CD-ROM), a digital versatile disc (DVD) or other optical storages, magnetic cassette tapes, magnetic diskettes or other magnetic storage device, or any other non-transmission medium, which can be used for the storage of information accessible to a computing device. According to the definitions herein, the computer readable medium does not include any temporary computer readable media (transitory media), such as modulated data signal and carrier wave.

The embodiments herein are all described in a progressive manner, and the same or similar portions of the embodiments can refer to each other. Each embodiment lays an emphasis on its distinctions from other embodiments. In particular, the apparatus embodiment is described simply since it is substantially similar to the method embodiment; please refer to the description of the method embodiment for the relevant content.

The present disclosure may be used in a variety of general or dedicated computer system environments or configurations, such as a personal computer, a server computer, a handheld or portable device, a tablet device, a multiprocessor system, a microprocessor-based system, a set-top box, a programmable electronic device, a network PC, a small-scale computer, a large-scale computer, a distributed computing environment including any of the above systems or devices, and the like.

The present disclosure may be described in the general context of computer executable instructions executed by the computer, e.g., the program module. In general, the program module includes a routine, a program, an object, a component, a data structure, etc. executing a particular task or realizing a particular abstract data type. The present disclosure may also be put into practice in the distributed computing environments where tasks are executed by remote processing devices connected through a communication network. In the distributed computing environments, the program modules may be located in the local and remote computer storage medium including the storage device.

Although the present disclosure is described through the embodiments, those skilled in the art will know that that there are many modifications and changes of the present disclosure without deviating from the spirit of the present disclosure, and it is intended that the appended claims include those modifications and changes without deviating from the spirit of the present disclosure.

The invention claimed is:

1. A method for determining the permeability of a reservoir, wherein the reservoir comprises at least two borehole radial zones, each of the zones comprises annular regions centered on a well axis of a target well in the reservoir, and the annular regions are located outside the target well, wherein the at least two borehole radial zones comprised in the reservoir are a first zone, a second zone, a third zone, and a fourth zone respectively; wherein a distance between the first zone and a target borehole ranges from 0 m to 0.1 m, a distance between the second zone and the target borehole ranges from 0.1 m to 1 m, a distance between the third zone and the target borehole ranges from 1 m to 10 m, and a distance between the fourth zone and the target borehole ranges from 10 m to 40 m; the method comprises:

acquiring logging data corresponding to the at least two zones respectively;

determining the permeability of a specified zone in the at least two zones based on logging data corresponding to the specified zone, wherein the specified zone represents any one of the at least two zones;

setting weight values corresponding to the at least two zones respectively; and determining the permeability of the reservoir based on the weight values and the permeability respectively corresponding to the at least two zones, wherein, logging data corresponding to the first zone comprises an electrically imaged logging image;

logging data corresponding to the second zone comprises array acoustic wave logging data;

logging data corresponding to the third zone comprises monopole far-detection logging data; and logging data corresponding to the fourth zone comprises dipole far-detection logging data;

correspondingly, determining the permeability of the first zone based on the electrically imaged logging image;

determining the permeability of the second zone based on the array acoustic wave logging data;

determining the permeability of the third zone based on the monopole far-detection logging data; and determining the permeability of the fourth zone based on the dipole far-detection logging data, wherein determining the permeability of the first zone based on the electrically imaged logging image comprises:

calculating a porosity of a specified pixel point in the electrically imaged logging image in the following formula:

$$\phi_i = \sqrt[m]{a \cdot b \cdot R_{mf} \cdot C_i}$$

wherein, $\phi_i$ represents a porosity of an i-th pixel point in the electrically imaged logging image; a and b represent lithology factors respectively; m represents a formation cementation index; $R_{inf}$ represents a mud filtrate resistivity; and $C_i$ represents a conductivity of the i-th pixel point in the electrically imaged logging image;

determining a porosity distribution spectrum according to the porosity of the specified pixel point;

dividing the porosity distribution spectrum into a matrix porosity distribution spectrum and a secondary porosity distribution spectrum according to a preset porosity spectrum cutoff value, thereby obtaining a matrix porosity corresponding to the matrix porosity distribution spectrum and a secondary porosity corresponding to the secondary porosity distribution spectrum;

calculating the permeability of the first zone based on the matrix porosity and the secondary porosity in the following formula:

$$K_1 = f_1 10^{ka1 \times \varphi_{matric} + kb1} + f_2 10^{ka2 \times \varphi_f \times kb2}$$

wherein, $K_1$ represents the permeability of the first zone; $f_1$ and $f_2$ represent a matrix permeability coefficient and a secondary pore permeability coefficient respectively; ka1 and ka2 represent porosity indexes respectively; kb1 and kb2 represent permeability constants respectively; and $\varphi_{matrix}$ and $\varphi_{fv}$ represent the matrix porosity and the secondary porosity respectively.

2. The method for determining the permeability of a reservoir according to claim 1, wherein determining the permeability of the second zone based on the array acoustic wave logging data comprises:

determining Stoneley wave information corresponding to the second zone based on the array acoustic wave logging data, wherein the Stoneley wave information comprises at least one of a Stoneley wave attenuation rate and a Stoneley wave velocity;

calculating the permeability of the second zone based on the Stoneley wave information in the following formula:

$$k = \sqrt{k_e^2 + \frac{2i\rho_{pf}\omega K_2 R}{\eta(R^2-r^2)}\sqrt{-i\omega/D+k_e^2}\frac{A_1\left(R\sqrt{-i\omega/D+k_e^2}\right)}{A_0\left(R\sqrt{-i\omega/D+k_e^2}\right)}}$$

$$k = \frac{\omega}{v_{st}} + iAtt_{st}$$

wherein $K_2$ represents the permeability of the second zone; $\omega$ represents an angular frequency; $\rho_{pf}$ and $\eta$ represent a density and a viscosity of pore fluid in a formation of the second zone respectively; R represents a radius of the target well; r represents a radius of a logging instrument that acquires the array acoustic wave logging data; $k_e$ represents a Stoneley wave number of an equivalent elastic formation of the second zone; $A_0$ and $A_1$ represent a 0-th order second-class Bessel function of imaginary argument and a $1^{st}$ order second-class Bessel function of imaginary argument respectively; D represents a fluid diffusion rate; k represents a Stoneley wave number of the formation of the second zone; $v_{st}$ represents the Stoneley wave velocity; $Att_{st}$ represents the Stoneley wave attenuation rate; and i represents an imaginary unit and $i^2=-1$.

3. The method for determining the permeability of a reservoir according to claim 1, wherein determining the permeability of the third zone based on the monopole far-detection logging data comprises:

performing a first migration imaging processing on longitudinal reflected wave data in the monopole far-detection logging data, to obtain longitudinal wave migration imaging profile data, wherein the longitudinal wave migration imaging profile data comprises a plurality of longitudinal wave sampling points, amplitudes at positions of the longitudinal wave sampling points, and a radial distance between adjacent two of the longitudinal wave sampling points;

determining the permeability of the third zone based on the longitudinal wave migration imaging profile data in the following formula:

$$K_3 = a_1 \int_1^{10} |A_p|^{b_2} dx_2$$

wherein, $K_3$ represents the permeability of the third zone; $A_p$ represents an amplitude at a position of a longitudinal wave sampling point; $a_1$ and $b_1$ represent calculation indexes for the permeability of a longitudinal reflection wave; and $dx_1$ represents the radial distance between adjacent two of the longitudinal wave sampling points.

4. The method for determining the permeability of a reservoir according to claim 1, wherein determining the permeability of the fourth zone based on the dipole far-detection logging data comprises:

performing a second migration imaging processing on transverse reflected wave data in the dipole far-detection logging data, to obtain transverse wave migration imaging profile data, wherein the transverse wave migration imaging profile data comprises a plurality of transverse wave sampling points, amplitudes at positions of the transverse wave sampling points, and a radial distance between adjacent two of the transverse wave sampling points;

determining the permeability of the fourth zone based on the transverse wave migration imaging profile data in the following formula:

$$K_4 = a_2 \int_{10}^{40} |A_s|^{b_2} dx_2$$

wherein, $K_4$ represents the permeability of the fourth zone; $A_s$ represents an amplitude at a position of a transverse wave sampling point; $a_2$ and $b_2$ represent calculation indexes for the permeability of a transverse reflection wave respectively; and $dx_2$ represents the radial distance between adjacent two of the transverse wave sampling points.

5. The method for determining the permeability of a reservoir according to claim 1, wherein setting weight values corresponding to the at least two zones respectively comprises:

determining a weight value of each of the zones according to a distance between the zone and the wall.

6. The method for determining the permeability of a reservoir according to claim 1, wherein determining the permeability of the reservoir based on the weight values and the permeability respectively corresponding to the at least two zones comprises:

taking a sum of a product of the permeability of each of the at least two zones and corresponding weight value as the permeability of the reservoir.

7. An apparatus for determining the permeability of a reservoir, wherein the reservoir comprises at least two zones, each of the zones comprises annular regions centered on a well axis of a target well in the reservoir, and the annular regions are located outside the target well, wherein the at least two borehole radial zones comprised in the reservoir are a first zone, a second zone, a third zone, and a fourth zone respectively; wherein a distance between the first zone and a target borehole ranges from 0 m to 0.1 m, a distance between the second zone and the target borehole ranges from 0.1 m to 1 m, a distance between the third zone and the target borehole ranges from 1 m to 10 m, and a distance between the fourth zone and the target borehole ranges from 10 m to 40 m; the apparatus comprises a processor and a computer readable medium storing computer readable program code executable by the processor, the computer readable program code is performed to:

acquiring logging data corresponding to the at least two zones respectively;

determining the permeability of a specified zone in the at least two zones based on logging data corresponding to the specified zone, wherein the specified zone represents any one of the at least two zones;

setting weight values corresponding to the at least two zones respectively; and determining the permeability of the reservoir based on the weight values and the permeability respectively corresponding to the at least two zones.

wherein, logging data corresponding to the first zone comprises an electrically imaged logging image;

logging data corresponding to the second zone comprises array acoustic wave logging data;

logging data corresponding to the third zone comprises monopole far-detection logging data; and logging data corresponding to the fourth zone comprises dipole far-detection logging data;

correspondingly, determining the permeability of the first zone based on the electrically imaged logging image;

determining the permeability of the second zone based on the array acoustic wave logging data;

determining the permeability of the third zone based on the monopole far-detection logging data; and determining the permeability of the fourth zone based on the dipole far-detection logging data wherein determining the permeability of the first zone based on the electrically imaged logging image comprises:

calculating a porosity of a specified pixel point in the electrically imaged logging image in the following formula:

$$\phi_i = \sqrt[m]{a \cdot b \cdot R_{mf} \cdot C_i}$$

wherein, $\phi_i$ represents a porosity of an i-th pixel point in the electrically imaged logging image; a and b represent lithology factors respectively; m represents a formation cementation index; $R_{mf}$ represents a mud filtrate resistivity; and $C_i$ represents a conductivity of the i-th pixel point in the electrically imaged logging image;

determining a porosity distribution spectrum according to the porosity of the specified pixel point;

dividing the porosity distribution spectrum into a matrix porosity distribution spectrum and a secondary porosity distribution spectrum according to a preset porosity spectrum cutoff value, thereby obtaining a matrix porosity corresponding to the matrix porosity distribution spectrum and a secondary porosity corresponding to the secondary porosity distribution spectrum;

calculating the permeability of the first zone based on the matrix porosity and the secondary porosity in the following formula:

$$K_1 = f_1 10^{ka1 \times \varphi_{matric} + kb1} + f_2 10^{ka2 \times \varphi_{fv} + kb2}$$

wherein, $K_1$ represents the permeability of the first zone; $f_1$ and $f_2$ represent a matrix permeability coefficient and a secondary pore permeability coefficient respectively; ka1 and ka2 represent porosity indexes respectively; kb1 and kb2 represent permeability constants respectively; and $\varphi_{matrix}$ and $\varphi_{fv}$ represent the matrix porosity and the secondary porosity respectively.

* * * * *